United States Patent
Schneider

(10) Patent No.: US 10,123,472 B1
(45) Date of Patent: Nov. 13, 2018

(54) POSITION AIDED INERTIAL NAVIGATION SYSTEM FOR A FARMING IMPLEMENT NOT REQUIRING AN ADDITIONAL GNSS RECEIVER

(71) Applicant: Ag Leader Technology, Ames, IA (US)

(72) Inventor: Michael Schneider, Ames, IA (US)

(73) Assignee: Ag Leader Technology, Inc., Ames, IA (US)

( * ) Notice: Subject to any disclaimer, the term of this patent is extended or adjusted under 35 U.S.C. 154(b) by 136 days.

(21) Appl. No.: 15/200,995

(22) Filed: Jul. 1, 2016

Related U.S. Application Data

(60) Provisional application No. 62/187,550, filed on Jul. 1, 2015.

(51) Int. Cl.
| | |
|---|---|
| G06F 19/00 | (2018.01) |
| G05D 1/02 | (2006.01) |
| A01B 69/00 | (2006.01) |
| G01C 21/16 | (2006.01) |
| B62D 15/02 | (2006.01) |
| G01C 21/08 | (2006.01) |

(52) U.S. Cl.
CPC .......... *A01B 69/004* (2013.01); *B62D 15/025* (2013.01); *G01C 21/08* (2013.01); *G01C 21/165* (2013.01)

(58) Field of Classification Search
CPC ..... B62D 15/025; G01C 21/08; G01C 21/165

USPC .......................................................... 701/41
See application file for complete search history.

(56) References Cited

U.S. PATENT DOCUMENTS

| | | |
|---|---|---|
| 7,054,731 B1 | 5/2006 | Lange et al. |
| 7,580,783 B2 | 8/2009 | Dix |
| 2014/0303854 A1 | 10/2014 | Zielke |

OTHER PUBLICATIONS

Honeywell, "3-Axis Digital Compass IC HMC5883L", Advanced Information, available at www.honeywell.com/magneticsensors, 20 pages, Mar. 2011.
Sensonor, "Ultra-High Performance Inertial Measurement Unit (IMU)", Product Brief, available at www.sensonor.com, 2 pages, Oct. 2012.

*Primary Examiner* — Maceeh Anwari
(74) *Attorney, Agent, or Firm* — McKee, Voorhees & Sease, PLC

(57) ABSTRACT

Systems, apparatus, and methods for informing an on-tractor navigation system of position of a towed implement. In one aspect, a non-GNSS sensor mounted on the implement provides heading information to the navigation system. Knowledge of the geometry of the implement along with navigation coordinate frame position information from the navigation system, allows a relatively economical and flexible way to derive implement position information without the expense of a GNSS receiver on the implement Adding inertial sensors on the implement can allow position determination of any point on the implement relative to the ground. This can be advantageously used for swath and rate control for implements.

24 Claims, 8 Drawing Sheets

POSITION AIDED INERTIAL NAVIGATION SYSTEM FOR A FARMING IMPLEMENT NOT REQUIRING AN ADDITIONAL GNSS RECEIVER

CROSS-REFERENCE TO RELATED APPLICATIONS

This application claims the benefit under 35 U.S.C. § 119 to provisional application Ser. No. 61/187,550 filed Jul. 1, 2015, which is incorporated by reference herein in its entirety.

BACKGROUND OF THE INVENTION

Field of the Invention

The present invention relates to precision agriculture and, in particular, to deriving position information about an implement towed or moved by a tractor or motive force through a field, to assist in automatic steering of the tractor to maintain the implement along a pre-determined path through the field.

Related Art

It is desirable to know the position of an implement so that a tractor can be steered to correctly position the implement with respect to a predetermined path on the farming field. Knowing the position of all points on the implement with respect to the farming field (in navigation coordinates) also allows swath control and rate control for planting, spraying, and other operations. Knowing the position of one point on the implement and the heading and attitude angles of the implement allows the position of any point on the implement to be determined. Knowing the roll and pitch angles of the implement allows the position determination to be transferred to the ground correctly.

One solution that allows position, velocity, and the roll, pitch, and heading angles of a vehicle or device to be determined is a GNSS aided inertial navigation system. The implementation of such a system is well known and in common use. In its typical form, a GNSS aided inertial navigation system requires that both a GNSS antenna and an inertial measurement unit be mounted on the vehicle or device. In such a system, the GNSS antenna/receiver provides 3-D position information in navigation coordinates of the point on the implement where it is mounted.

One example of an attempt to derive offset between implement and vehicle is shown in FIG. 1, which is taken from U.S. Pat. No. 7,580,783 (incorporated by reference herein). A GNSS and/or GNSS/INS system with a GNSS antenna/receiver 112 on-board tractor 100 with auto-steering is programmed with the intended path 124 from implement 102. As shown in FIG. 1, path A of tractor 100 differs from that of towed implement 102 on this curved path 124. Correction in position is with a hitch position sensor. For details see U.S. Pat. No. 7,580,783, including details about how information from the hitch position sensor is used by the tractor navigation/auto-steering system to automatically steer the tractor to urge the implement to follow the pre-determined path. It uses sensor at hitch for relative position of implement. However, there is not measurement of implement heading or roll and pitch.

An example of tractor and towed implement using a GNSS antenna/receiver on-board the implement is illustrated in FIG. 2A and FIG. 2B, which are taken from U.S. Pat. No. 7,054,731 (incorporated by reference herein). Entitled, "Farm implement guidance method and apparatus", U.S. Pat. No. 7,054,731 uses GNSS on the implement for absolute position of implement. Tractor 14 includes a GNSS (global navigation satellite system) and/or INS (inertial navigation system) guidance system 26 with a GNSS receiver 24 on-board. Implement 12 includes GNSS receiver 48 (a second GNSS receiver). It tries to correct implement position with several versions of a controllable hitch which would be instructed by the tractor navigation system. Further details can be found in U.S. Pat. No. 7,054,731.

FIG. 2B is a diagrammatic and simplified illustration of how the second GNSS receiver 24 of U.S. Pat. No. 7,054,731 could communicate with the tractor GNSS navigation system to provide absolute position information about the implement. As indicated, this approach needs two GNSS receivers (#1 and #2), which adds considerable expense. Cost of GNSS receivers/antennas can vary widely, depending on features such as accuracy. Typically, those needed for precision agriculture cost at least on the order of several hundreds of dollars, and can be several thousands. This can be a significant factor when the tractor mounted GNSS and/or GNSS/INS system is on that same general order of cost. Also, farmers may want implement position information for several different implements.

The inventor has therefore identified room for improvement in this technical area.

SUMMARY OF THE INVENTION

One aspect of the present invention is a position aided inertial navigation system for a towed farming implement that eliminates the need for mounting a GNSS antenna/receiver to the implement. With this aspect of the invention, the position information which would normally be supplied by a GNSS system mounted on the implement is provided indirectly by the tractor navigation system determining position of the hitch point of the implement combined with knowledge of the geometry of the implement, and the heading information, that might be determined from the direction of position changes of the GNSS antenna in a tractor navigation system, is provided by a magnetometer mounted on the implement. The magnetometer can provide earth fixed frame information (e.g. heading) to the tractor-mounted navigation system, which can be translated if needed to the navigation system navigation frame coordinate system. So this aspect of the invention provides the benefits of having a separate position aided inertial navigation system for the implement with significantly reduced cost because it does not require a separate GNSS antenna/receiver mounted to the implement.

In another aspect of the invention, in additional to a magnetometer on the implement, inertial sensors, one example being an inertial measurement unit (IMU), can be added to the implement. The inertial sensors can provide inertial information (e.g. pitch rate, roll rate, among others) to the tractor navigation system, which can be translated to the navigation frame. In one example, this inertial information can be used to allow the navigation system to derive position of any point on the implement relative to the navigation frame and the field, because of the known geometry of the implement. It also allows the navigation system to derive information of any said point of the implement relative to the ground. This allows, for example, such things as use with swath and rate control across the implement. Currently farmers use a second GNSS antenna on the implement to determine the location of a farming implement. Use of a magnetometer and inertial sensors on the implement would be much less expensive.

Aspects of the invention include ability to gain useful position information about a towed implement. In addition, it can be obtained more economically than using an implement-mounted GNSS receiver. These concepts also do not require a sensor at the hitch point.

This invention provides a low cost solution for a position aided inertial navigation system for a farming implement. Such a system can provide knowledge of implement position which is needed for precision farming.

DETAILED DESCRIPTION OF EXEMPLARY EMBODIMENTS OF THE INVENTION

Overview

For a better understanding of the invention, several examples of it will now be described in detail. It is to be understood that these examples are by way of illustration and not limitation, and they that are neither exclusive nor inclusive of all forms the invention can take.

In these embodiments, a tractor is the motive force or vehicle with on-board navigation system and the implement is illustrated as a planter. As will be appreciated by those skilled in the art, the tractor can take many forms and other motive forces or vehicles are possible. Likewise, a wide variety of implements can be used with the invention.

Furthermore, the on-board navigation system on the tractor or other vehicle can take many forms. Most of the discussion will include a navigation system that uses at least one GNSS receiver and antenna mounted somewhere on-board the vehicle. Likewise, auto-steering of vehicles is well-known in the art. Details regarding operating principles of navigations systems can be found at U.S. Pat. No. 7,580,783 and U.S. Pat. No. 7,054,731. Examples of commercially available navigation systems include Ag Leader Technology of Ames, Iowa USA, including InCommand™ and Compass™ guidance and steering displays, GPS 6000™ and GPS 6500™ GNSS technology, and ON TRAC™ assisted steering and SteerCommand™ automated steering products.

Apparatus

Figure 3:
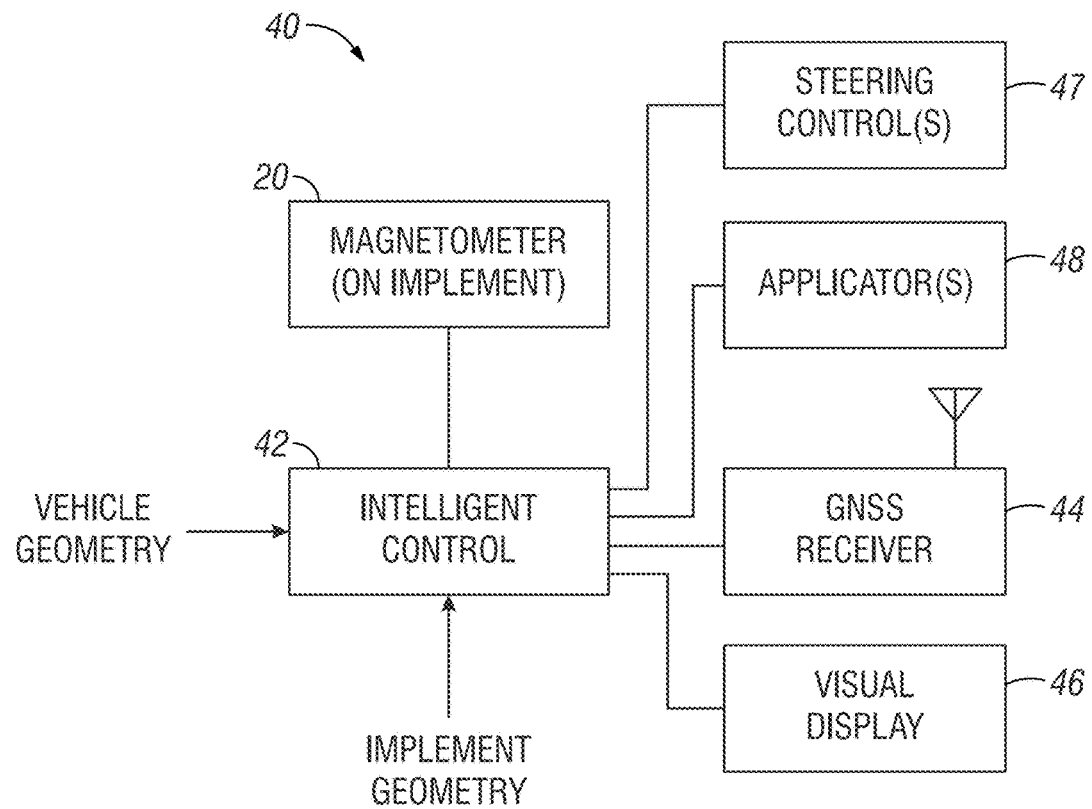
FIG. 3 is similar to FIG. 2B, but shows diagrammatically a difference between the prior art use of two GNSS receivers in comparison to an exemplary embodiment of the present invention, where implement position information is obtained from a magnetometer mounted on the implement instead of a second GNSS receiver. An IMU including a magnetometer can be used or an IMU can also be mounted on the implement to provide such things as implement pitch and roll measurements to the tractor navigation system.
Figure 4:
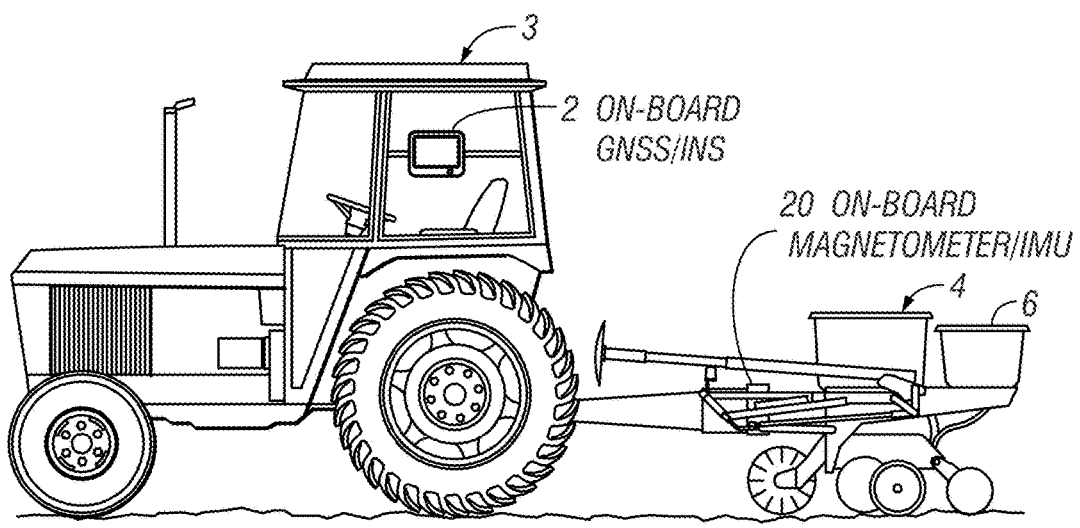
FIG. 4 is a side view of the embodiment of the invention of FIG. 3 is added to one type of tractor and one type of two-behind implement.
Figure 5:
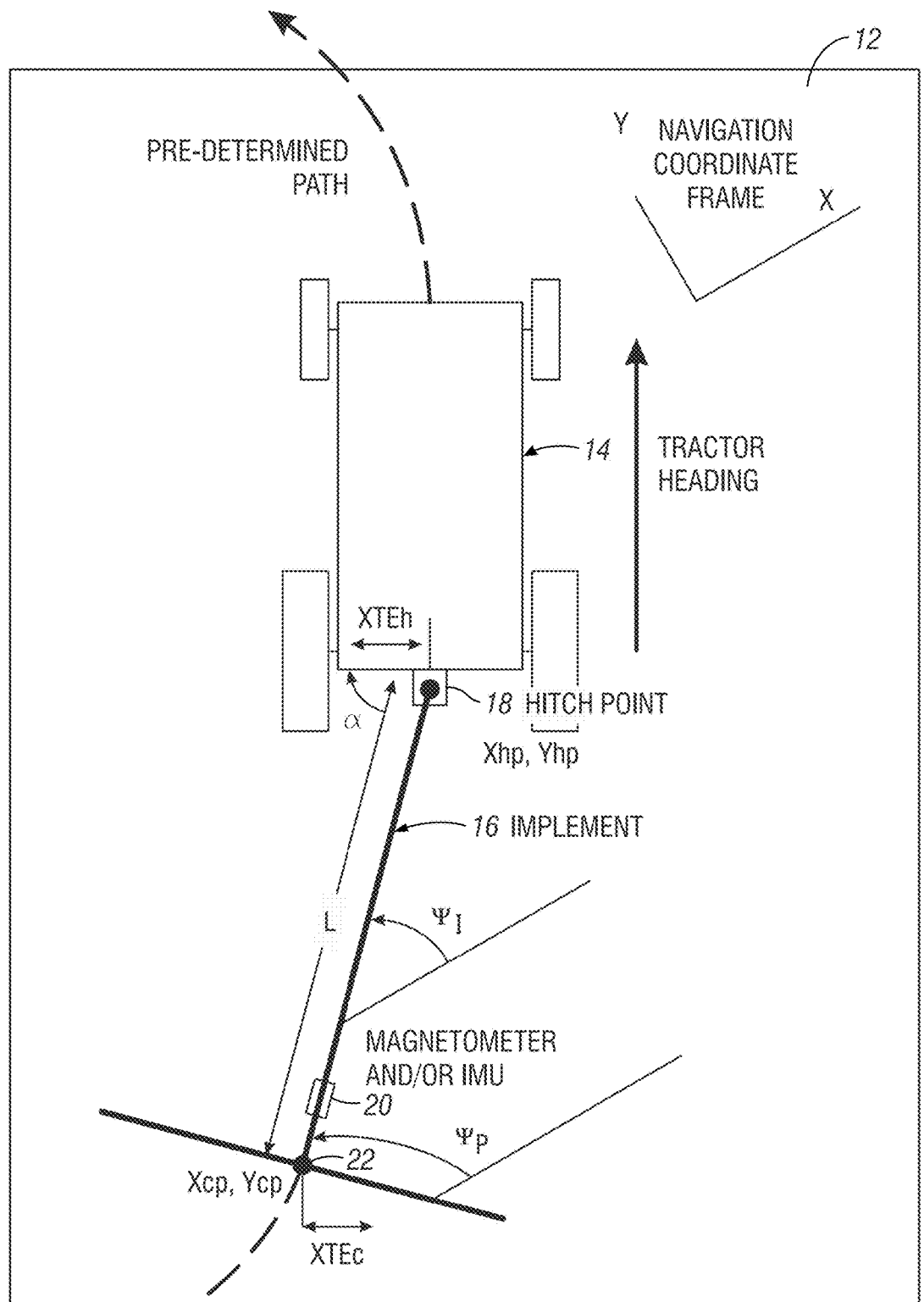
FIG. 5 is a top view diagram of how the embodiment of FIG. 3 relates tractor and implement to the navigational coordinate frame of the navigation system on-board the tractor.

With particular reference to FIGS. 3-5, a first exemplary embodiment of the invention will be described. The overall system 10 will include a field 12 through which a tractor 14 traverses towing an implement 16 from a hitch point 18. An on-board precision agriculture navigation system 40 is programmed relative to a navigation coordinate frame (shown diagrammatically in FIG. 5) which is also correlated to field 14.

In this example, navigation system 40 is a GNSS aided INS system, such as are well-known in this art, including an intelligent control or digital processor 42, a GNSS receiver 44, and a human-machine interface display 46. See FIG. 3.

Implement 16 has mounted to it a magnetometer 20. It can provide its measurements on a continuous basis to navigation system 40.

One example of such a magnetometer is model HMC5883L COM-1094, three axis digital magnetometer from Honeywell of Plymouth, Minn. USA. It has a relatively small package size (3×3×1 mm) but is robust such as for the working conditions of agriculture field operations. It is relatively cheap (e.g. on the order of $7 or less). It uses low power (2.16-3.6 VDC) and a standard communications technique (an I2C or $I^2C$ interface). Therefore, it is magnitudes less expensive than the type of GNSS receivers used in these applications, is not difficult to mount somewhere on most any implement, and can be conveniently operably connected to the tractor nav system 40.

As is indicated in the Figures, in addition to a magnetometer, an IMU can be mounted on implement 16. An inertial measurement unit (IMU) is an electronic device that measures and reports a body's specific force, angular rate, and sometimes the magnetic field surrounding the body, using a combination of accelerometers and gyroscopes, sometimes also magnetometers. For purposes of this description, the term IMU means a unit with a three axis accelerometer combination (three accelerometers measuring acceleration on three axes) and a three axis gyroscopic combination (three gyroscopes measuring angle rate on three axes). Sometimes a magnetometer comes with an IMU in the same housing or assembly. In any case, in this embodiment, on-board the implement will be mounted a magnetometer and an IMU that provide their measurements to tractor nav system 40. The invention derives position of the IMU on the implement to ultimately derive position of the control point of the implement. A possible alternative to an IMU is a three axis accelerometer alone.

One example of an IMU is an ADAFRUIT 9-DOF L#GD20H+LSM303 IMU available from AdaFruit Industries, LLC, New York, N.Y. USA. This IMU has a relatively small (around 30 $cm^3$) but rugged package. It is relatively inexpensive (e.g. on the order of $20 from some sources). It also uses I2C 7-bit addresses. It provides 3 axes accelerometer, 3 axes gyroscopic, and 3 axes magnetic (compass) data. It therefore includes a magnetometer.

This navigation system will provide roll, pitch, and heading angles of the implement, and position and velocity of a point on the implement. With this information from the navigation system, and with knowledge of the implement geometry, the location of any point on the implement can be determined in navigation coordinates using commonly known methods. This embodiment requires that an inertial measurement unit (IMU) and a magnetometer be mounted to the implement. This embodiment also requires that the towing vehicle has a GNSS aided navigation system or some type of GNSS based position measurement system that can provide the position of the hitch point in navigation coordinates.

A GNSS aided inertial navigation system is a system that uses certain measured signals that are available for measurement along with knowledge of the system to estimate system variables that cannot be measured. The navigation system may also estimate improved versions of measured signals by reducing signal noise or bias errors.

Although there are several possible formulations of a GNSS aided inertial navigation system for a farming vehicle or implement, the essential characteristics that are common to this type of system, and to this invention, are the measurements that are required and the estimated signals that are produced.

Figure 1:
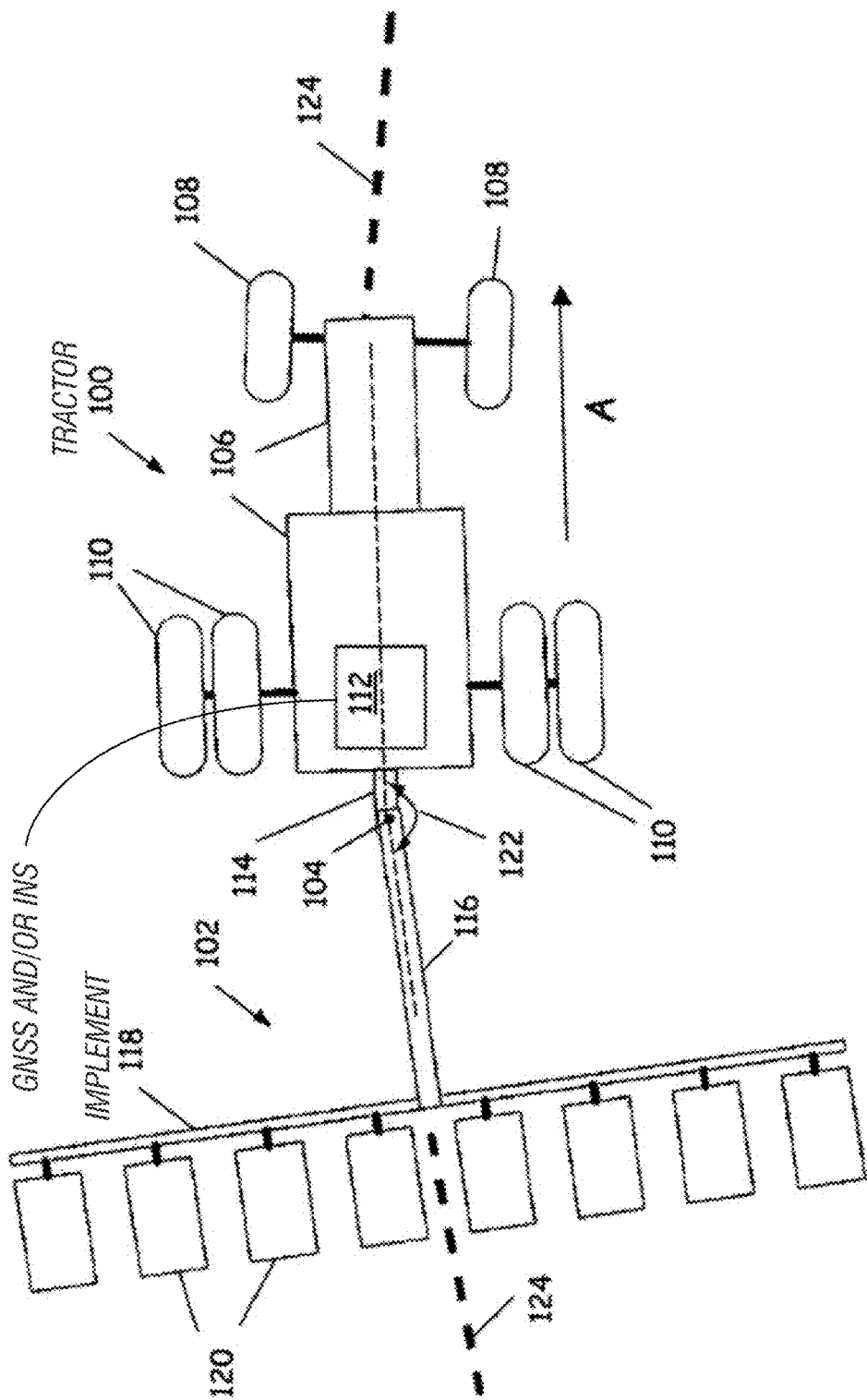
FIG. 1 is a figure from U.S. Pat. No. 7,580,783 showing one prior art attempt to gain information about position of a towed implement for use by a navigation system on-board the vehicle (tractor) towing the implement.
Figure 2A:
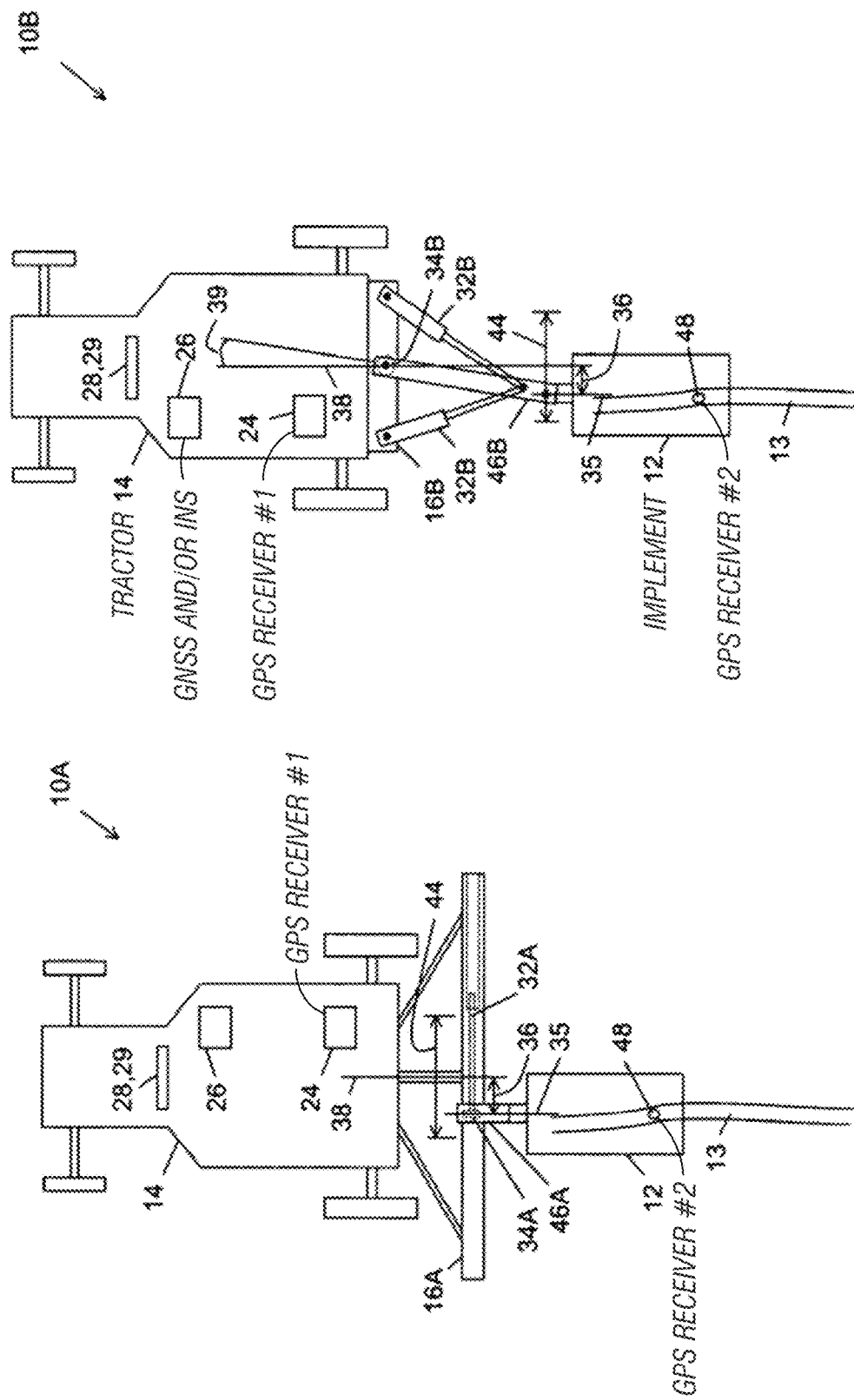
FIG. 2A are two figures from U.S. Pat. No. 7,054,731 showing the typical prior art way of providing implement position information to a tractor navigation system, namely a GNSS receiver #1 on the tractor and a GNSS receiver #2 mounted on the implement.
Figure 2B:
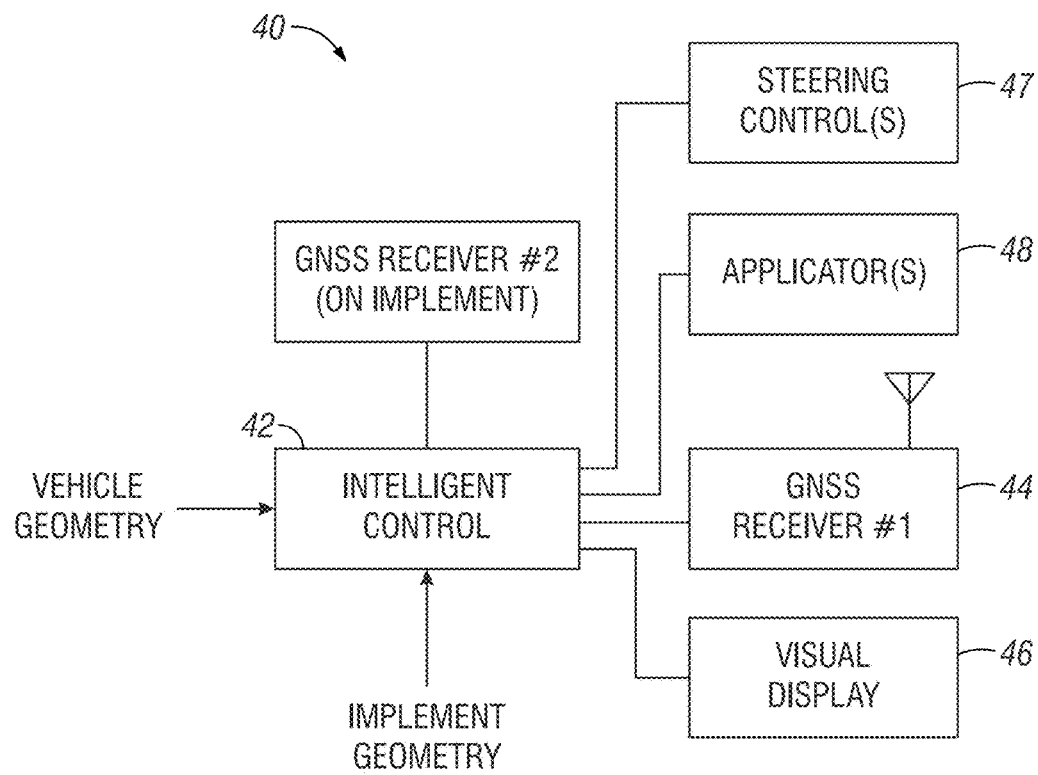
FIG. 2B is a diagrammatic illustration of the use of a GNSS receiver #2 on the implement to inform a tractor navigation system with GNSS receiver #1 of implement position, as in the prior art system of U.S. Pat. No. 7,045,732 in FIG. 2A.

Therefore, as illustrated in FIGS. 3-5, this embodiment does not use a second GNSS receiver on the implement (compare the prior art of FIGS. 2A and B). Instead is uses inexpensive, small but rugged, IMU (gyroscopes and accelerometers) and a small but rugged magnetometer all in the same housing or assembly which can be placed almost anywhere on an implement (they do not suffer from mounting limitations of GNSS receivers and antennas), and are much less expensive.

Operation

Figure 6A:
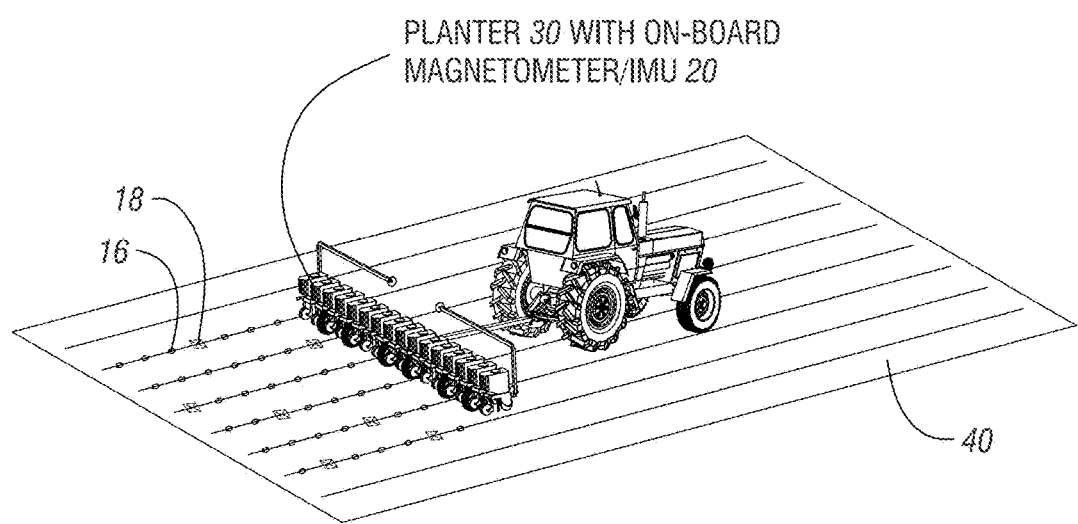
FIG. 6A is a diagram illustrating application of the methodology of FIGS. 3-5 to auto-steering of a tractor with a planter as the towed-implement.
Figure 6B:
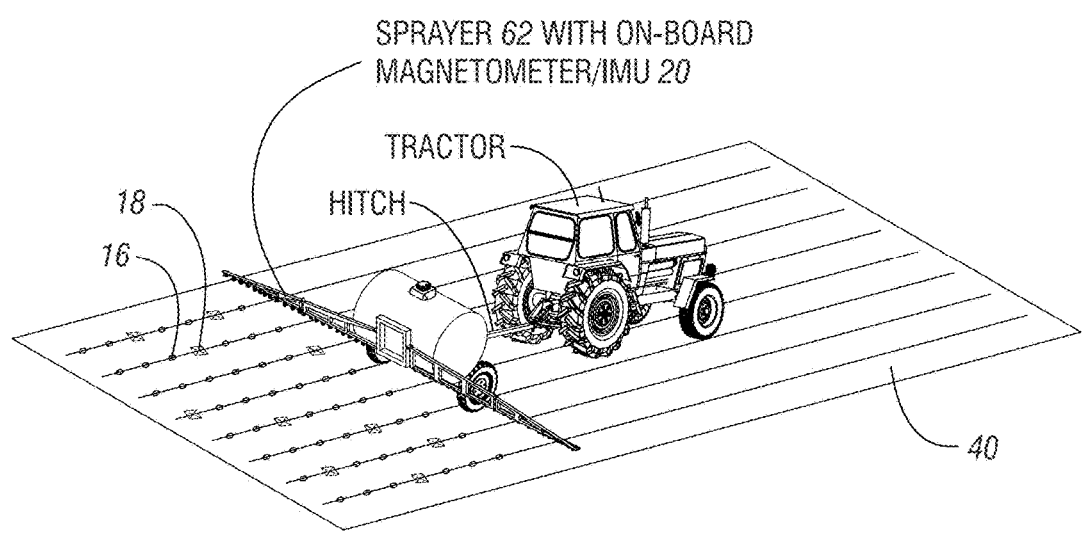
FIG. 6B is a diagram illustrating application of the methodology of FIGS. 3-5 to auto-steering of a tractor with an applicator as the towed-implement.

With further reference to FIGS. 6A and B, operation of the apparatus discussed above will be set forth.

A common implementation, and the preferred embodiment for this invention, requires a heading or direction measurement and measurements defining position in three dimensional space. It also requires accelerometer and gyro measurements, and would typically use tri-axial accelerometers and tri-axial gyros, which comprise the IMU. The heading or direction measurement is typically derived from the travel direction (change in position) of the position measurement, or may be measured using a magnetometer. In a typical system the position measurements would be provided by the GNSS receiver.

Velocity measurements which correspond to the same location on the implement as the position measurements, may also be used. Like the heading or travel direction measurement, the velocity measurements, if used, would be derived from changes in the GNSS position measurements. The navigation system solution would typically provide estimates of the position and velocity of a point on the implement in three dimensional space, as well as the heading angle, the attitude angles, pitch and roll, and the bias values of the three accelerometers and three gyros.

Depending on the implementation, additional measurements may be used, and additional variables may be estimated.

Since the information provided by the navigation system can be used to determine the location in the navigation coordinate frame of all other points on the implement, this allows swath control and rate control of planting, spraying, and other applicator functions. When a portion of the implement passes over an area of ground that has previously been planted or sprayed, or for some other reason should not receive the application, the planters, nozzles, or other application devices on that portion of the implement can be shut off until they again reach ground intended to receive the application. This intentional variation in the lateral sweep of the application is called swath control.

When the implement is pulled along a curved path with significant curvature, the side of the implement at the outside of the curve will travel over the ground at a faster rate than the side at the inside of the curve. In this case it is often desirable to increase the application rates of planters, nozzles, or other applicators that are traveling faster over the ground, and reduce the application rate of devices traveling slower, so that the seeds or chemicals are applied to each section of ground in the desired density. The ability to calculate the location with respect to the earth of each applicator on the implement also allows the velocity of each point to be calculated as the rate of change of location, and this allows the application rate of each applicator device on the implement to be individually controlled according to its velocity. This intentional variation in the application rate of applicator devices according to their velocity is called rate control.

When a tractor is pulling an implement, the location of the implement and the location of application of product in the field are indicated for the farmer on a computer display. Correct mapping of the implement and product application area on the visual display require that the position of the implement in the field is correctly known.

Options and Alternatives

As indicated above, the invention is not limited to the specific embodiments discussed, and can take many forms and embodiments. Variations will be appreciated by those skilled in the art. The designer can make various design choices within the invention.

Details of the calculations may vary, but the claimed concept is a position aided inertial navigation system for a farming implement which eliminates the need for a GNSS receiver mounted to the implement by receiving position information of the implement hitch from a tractor navigation system and a measurement of the heading of the implement from a magnetometer mounted to the implement. This invention includes inertial sensors mounted to the implement that provides at least tri-axial accelerometer signals. In a preferred embodiment, tri-axial gyro signals are also supplied to the system.

The novel concept of this invention is the elimination of the need for a GNSS unit mounted to the implement in the implementation of a position aided inertial navigation system for the implement, by providing position information at the implement hitch point with information commonly available from the tractor navigation system.

Information provided by the navigation system can be used to determine the location in the navigation coordinate frame of any point on the implement using commonly known methods. This location information can then be applied to steering control, swath control, rate control, and displayed information as described above.

The degree of accuracy of the invention can vary. For example, it can depend on the accuracy of the hitch point position provided by the tractor navigation system and by the accuracy of the magnetometer heading measurement. The designer can take these into account when selecting components and designing and calibrating the system. For example, it may be desirable to have accuracy of hitch point on the order of 2 to 5 cm, and accuracy of the magnetometer heading measurement on the order of between 1 to 5 degrees to balance accuracy and cost. However, the invention does not necessarily require these ranges to be useful or beneficial. As will be understood by those skilled in the art, accuracy can vary greatly depending on the navigation system, including differential GNSS correction techniques such RTK or WAAS. The invention is not limited by the ranges stated above.

One form the invention can take is as follows.

The tractor has a navigation system that uses a GNSS receiver to determine position of the tractor. This is not necessarily the only way to determine tractor position. Other vehicles might be used instead of a tractor.

The position of the implement hitch point is derived from the navigation system on the tractor. This can be done in various ways, within the skill of those skilled in the art.

There are inertial sensors attached to the implement that include at least three mutually perpendicular accelerometers (sometimes referred to as a three axis or tri-axis accelerometer). Alternatively, the inertial sensors on the implement may comprise an IMU which would have three accelerometers and three gyrometers.

The heading of the implement is determined from a magnetometer mounted on the implement. One possible alternative for implement heading is a relative position sensor at the hitch that allows the implement heading to be determined from the tractor heading and the relative heading of the implement with respect to the tractor. Such a hitch sensor could be, for one example, the hitch position sensor described in U.S. Pat. No. 7,580,783 referenced above.

The invention claimed is:

1. A method of autosteering a tractor with a precision agriculture navigation system on-board and towing from a hitch point an implement without a GNSS antenna or receiver on-board comprising:
   a. obtaining heading information related to heading of the implement without a GNSS antenna or receiver;
   b. obtaining hitch point position information from the tractor navigation system;
   c. obtaining inertial information related to at least one of roll rate and pitch rate of the implement from inertial sensors mounted at mounting locations on the implement, including locations where effectiveness of a GNSS antenna would not be reliable;
   d. using hitch point position information and inertial information from the inertia sensors mounted on the implement to estimate at least one of roll angle and pitch angle of the implement; and
   e. using the heading information from the inertia sensors mounted on the implement, inertial information, and the hitch point position information to provide autosteering instructions to the tractor to keep the implement on a predetermined path computed by the navigation system.

2. The method of claim 1 wherein the heading information is obtained from:
   a. a magnetometer on the implement.

3. The method of claim 1 wherein the inertial information comprises accelerations and angular rates.

4. The method of claim 3 wherein the accelerations and angular rates are communicated to the navigation system and used to estimate roll and pitch of the implement.

5. The method of claim 4 further comprising using the roll and pitch estimates by the navigation system when generating swath or rate instructions related to the implement.

6. The method of claim 3 wherein the inertial information is from an IMU which includes the inertia sensors on the implement.

7. The method of claim 1 wherein the implement is a planter.

8. The method of claim 1 wherein the implement is an applicator of gas, liquid, or solid phase substances.

9. The method of claim 1 wherein:
   a. the heading information is obtained from a magnetometer on the implement; and
   b. the inertial information is obtained from the inertial sensors comprising at least three accelerometers on the implement.

10. The method of claim 1 wherein the navigation system comprises GNSS aided INS and hitch position is derived from the navigation system.

11. A system including a tractor with an on-board navigation system and towing from a hitch point an implement without a GNSS antenna or receiver on-board the implement comprising:
   a. a navigation system on the tractor for obtaining hitch point position information;
   b. at least one inertial sensor mounted at a mounting location on the implement, including locations where effectiveness of a GPS antenna would not be reliable, for obtaining and communicating heading information of the implement to the tractor navigation system;
   c. the at least one inertial sensor on the implement communicating with the tractor navigation system for obtaining, in combination with the hitch point position information, at least one of implement roll and pitch angle estimates;
   d. so that heading information and pitch and roll angle information related to the implement from the inertial sensor on the implement is available for deriving position information of the implement in navigation coordinate frame without a GNSS antenna or receiver on the implement.

12. The system of claim 11 wherein the at least one inertial sensor from which heading information can be derived comprises;
   a. a magnetometer on the implement.

13. The system of claim 12 wherein the at least one inertial sensor comprise an IMU.

14. The system of claim 11 further comprising an autosteering system associated with the vehicle and the position information of the implement is used to generate autosteering instructions from the navigation system.

15. The system of claim 11 wherein the at least one inertial sensor mounted on the implement comprise at least three accelerometers.

16. The system of claim 11 wherein the roll and pitch angle estimates are included by the navigation system in generating swath or rate instructions to the implement.

17. The system of claim 16 wherein the implement comprises a planter.

18. The system of claim 16 wherein the implement comprises an applicator of gas, liquid or solid phase substance.

19. The system of claim 11 wherein the vehicle comprises a tractor for use in an agricultural field.

20. The system of claim 11 wherein the navigation system comprises a GNSS aided INS and hitch point position is derived from the navigation system.

21. A method of controlling a tractor towing at a hitch point an implement in a field comprising:

a. providing a tractor with a navigation system and autosteering system on-board;
b. providing an implement with a plurality of inertial sensors on-board;
c. calculating with the navigation system a predetermined path for the implement through the field;
d. deriving hitch point position with the tractor navigation system;
e. deriving implement position in navigation coordinates using hitch point position from the tractor navigation system, implement heading from at least one of the plurality of inertia sensors on the implement and without a GNSS antenna or receiver, and three-axis accelerations from the inertial sensors on the implement; and
f. instructing the autosteering system using the derived implement position.

22. The method of claim 21 further comprising:
a. instructing at least one of swath or rate control using the derived implement position.

23. The method of claim 21 wherein the inertial sensors are associated with an IMU.

24. The method of claim 21 wherein the inertial sensors are in shared housing and include a magnetometer.

* * * * *